United States Patent
He

(10) Patent No.: US 8,301,036 B2
(45) Date of Patent: Oct. 30, 2012

(54) HIGH-SPEED ADAPTIVE DECISION FEEDBACK EQUALIZER

(75) Inventor: Runsheng He, Sunnyvale, CA (US)

(73) Assignee: Credo Semiconductor (Hong Kong) Limited, Hong Kong (HK)

( * ) Notice: Subject to any disclaimer, the term of this patent is extended or adjusted under 35 U.S.C. 154(b) by 528 days.

(21) Appl. No.: 12/618,735

(22) Filed: Nov. 15, 2009

(65) Prior Publication Data

US 2011/0116806 A1 May 19, 2011

(51) Int. Cl.
*H04B 10/06* (2006.01)

(52) U.S. Cl. ........ 398/202; 398/208; 398/209; 398/135; 398/136; 398/137; 398/158; 398/159; 375/233; 375/317; 375/232; 375/376

(58) Field of Classification Search .................. 398/202, 398/208, 209, 158, 159, 154, 155, 149, 135, 398/136, 137, 138, 214, 139, 161, 164, 25, 398/26, 27, 29, 102; 375/233, 232, 234, 375/376, 317, 316, 371, 346, 348, 350
See application file for complete search history.

(56) References Cited

U.S. PATENT DOCUMENTS 7,505,695 B2 * 3/2009 Sugihara et al. .............. 398/202
7,574,146 B2 * 8/2009 Chiang et al. ................. 398/209

* cited by examiner

*Primary Examiner* — Hanh Phan
(74) *Attorney, Agent, or Firm* — Krueger Iselin LLP

(57) ABSTRACT

A decision-feedback equalizer (DFE) can be operated at higher frequencies when parallelization and pre-computation techniques are employed. Disclosed herein is a DFE design that operates at frequencies above 10 GHz, making it feasible to employ decision feedback equalization in optical transceiver modules. An adaptation technique is also disclosed to maximize communications reliability. The adaptation module can be treated as a straightforward extension of the pre-computation unit. At least some method embodiments include, in each time interval: sampling a signal that is partially compensated by a feedback signal; comparing the sampled signal to a set of thresholds to determine multiple speculative decisions; selecting and outputting one of the speculative decisions based on preceding decisions; and updating a counter if the sampled signal falls within a window proximate to a given threshold. Once a predetermined interval has elapsed, the value accumulated by the counter is used to adjust the given threshold.

20 Claims, 4 Drawing Sheets

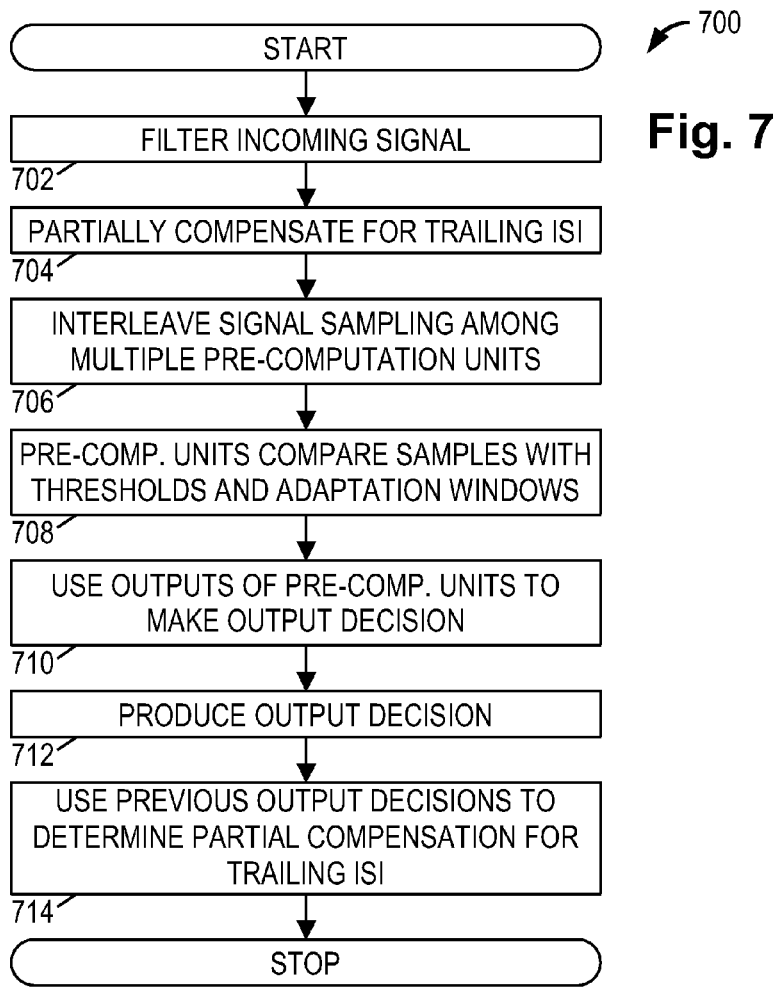
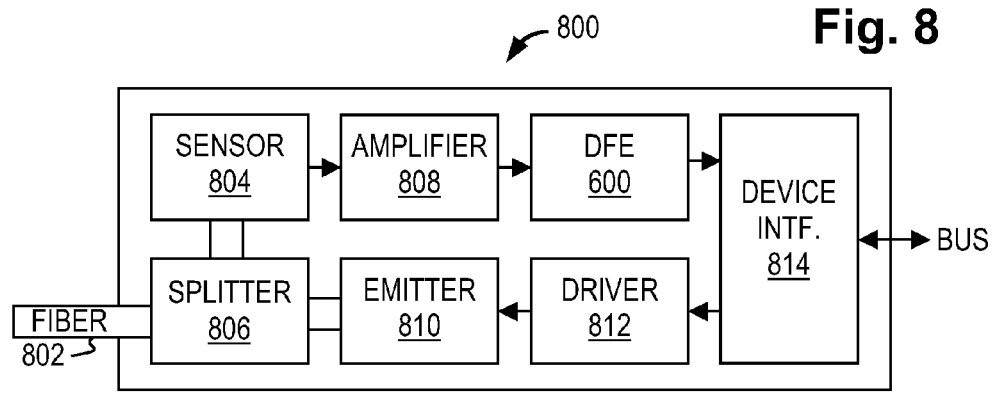

HIGH-SPEED ADAPTIVE DECISION FEEDBACK EQUALIZER

BACKGROUND

As digital data processing technology continues to improve, the need for higher data transmission rates continues to increase. For example, the IEEE long-reach multimode fiber standard IEEE 802.3aq (sometimes referred to as 10 GBASE-LRM) provides for a channel bit rate greater than 10 Gbit/s. Achieving data rates above a few gigabits per second is very challenging due to performance limitations of silicon-based integrated circuits.

During a typical high speed data communication, a sending device transmits symbols at a fixed and known symbol rate via a channel. A receiving device detects the sequence of symbols in order to reconstruct the transmitted data. A "symbol" is a state or significant condition of the channel that persists for a fixed period of time, called a "symbol interval." A symbol may be, for example, an electrical voltage or current level, an optical power level, a phase value, or a particular frequency or wavelength. A change from one significant channel condition to another is called a symbol transition. Each symbol may represent (i.e., encode) one or more binary bits of the data. Alternatively, the data may be represented by symbol transitions, or by a sequence of two or more symbols. The simplest digital communication links use only one bit per symbol; a binary '0' is represented by one symbol (e.g., an electrical voltage or current signal within a first range), and binary '1' by another symbol (e.g., an electrical voltage or current signal within a second range).

When a symbol is transmitted via a non-ideal physical medium (e.g., a fiber optic cable or insulated copper wires), dispersion by the medium may result in a portion of the energy of the symbol being located outside of the symbol interval in which the symbol was transmitted. When the energy outside the symbol interval perturbs symbol energy in neighboring symbol intervals, the symbol becomes a source of intersymbol interference (ISI).

In order to compensate for signal distortions due to ISI, equalization circuits have been added to digital data receiver circuits. Unlike linear equalizers, the nonlinear decision feedback equalizer (DFE) is advantageously capable of reducing the effects of ISI without amplifying noise or crosstalk, and hence it would be a desirable equalization option in high data rate systems.

As the name suggests, a DFE employs a feedback path, which generates an error signal based on previously-decided data symbols. In a straightforward implementation, a number of cascaded circuit elements are employed to generate the error signal and add it to the received input signal, a process that must be implemented in less than one symbol interval to avoid falling behind. At 10 Gbit/s ($10^{10}$ bits/sec), the symbol interval is 100 picoseconds, a value that is unachievable by cascaded circuit elements implemented with currently available silicon semiconductor processing technologies.

SUMMARY

The above described problems are at least partly addressed by the high-speed decision feedback equalization products and techniques disclosed herein. In at least some embodiments, the disclosed decision feedback equalizers employ parallelization and pre-computation to equalize bit streams at rates above 10 GHz, making it feasible to employ decision feedback equalization in optical transceiver modules. An adaptation technique is also disclosed to maximize communications reliability. The adaptation module can be treated as an extension of the pre-computation unit. At least some method embodiments include, in each time interval: sampling a signal that is partially compensated by a feedback signal; comparing the sampled signal to a set of thresholds to determine multiple speculative decisions; selecting and outputting one of the speculative decisions based on preceding decisions; and updating a counter if the sampled signal falls within a window proximate to a given threshold. Once a predetermined interval has elapsed, the value accumulated by the counter is used to adjust the given threshold.

BRIEF DESCRIPTION OF THE DRAWINGS

A better understanding of the various disclosed system and method embodiments can be obtained when the following detailed description is considered in conjunction with the following drawings, in which:

FIG. 7 shows one embodiment of a method for high speed equalization; and

FIG. 8 shows one embodiment of a fiber optic interface module including the DFE of FIG. 6.

Figure 1:
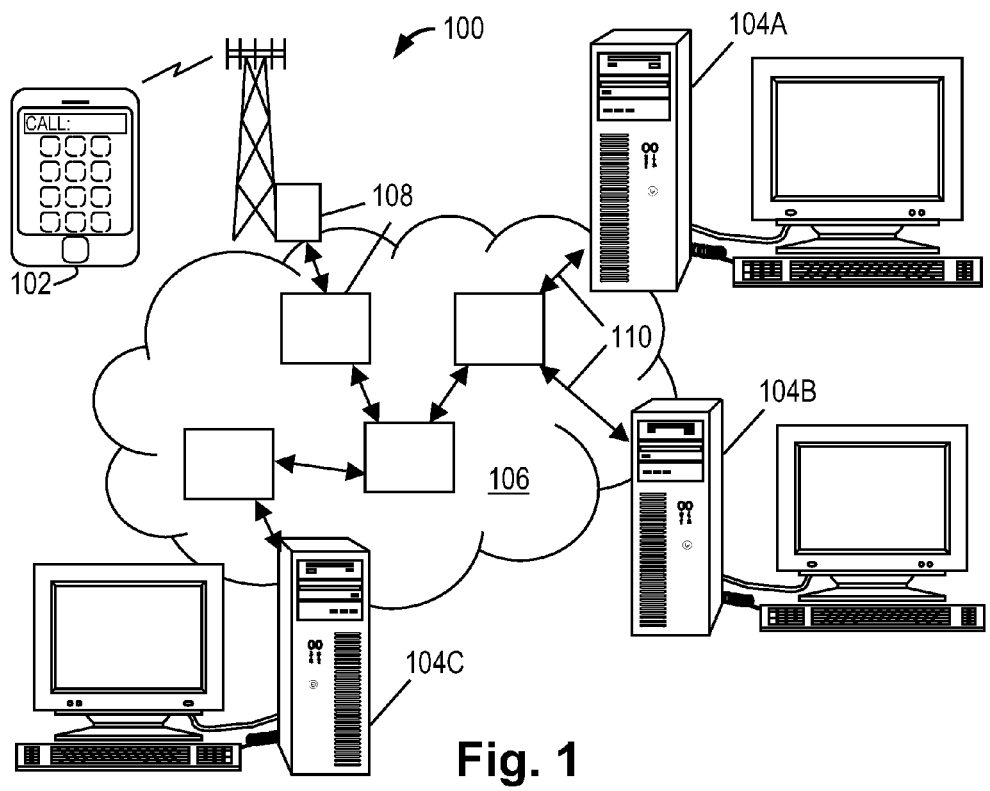
FIG. 1 shows an illustrative computer network.

While the invention is susceptible to various modifications and alternative forms, specific embodiments thereof are shown by way of example in the drawings and will herein be described in detail. It should be understood, however, that the drawings and detailed description thereto are not intended to limit the disclosure to the illustrated embodiments. To the contrary, the intention is to cover all modifications, equivalents and alternatives falling within the scope of the appended claims.

DETAILED DESCRIPTION

FIG. 1 is a diagram of an illustrative computer network 100 including cell phones 102 and computer systems 104A-C coupled to a routing network 106. The routing network 106 may be or include, for example, the Internet, a wide area network, or a local area network. In FIG. 1, the routing network 106 includes a network of equipment items 108, such as switches, routers, and the like. The equipment items 108 are connected to one another, and to the computer systems 104A-C, via point-to-point communication links 110 that transport data between the various network components.

Figure 2:
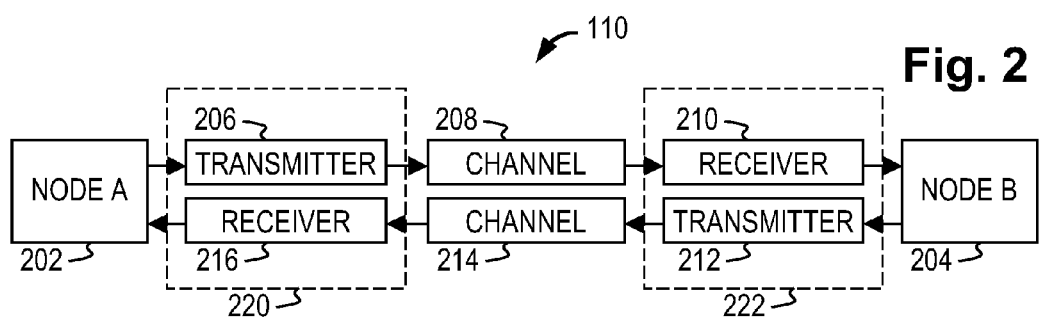
FIG. 2 shows one embodiment of a point-to-point communication link of FIG. 1.

FIG. 2 is a diagram of one embodiment of a representative point-to-point communication link 110 of FIG. 1. In the embodiment of FIG. 2, the point-to-point communication link 110 includes a "Node A" 202 at one end, and a "Node B" 204 at an opposite end. Node A may be, for example, one of the equipment items 108 of the computer network 100 of FIG. 1, or one of the computer systems 104A-C. Node B may be, for example, a different one of the equipment items 108, or a different one of the computer systems 104A-C.

Coupled to Node A is a transceiver 220, and coupled to Node B is a transceiver 222. Communication channels 208 and 214 extend between the transceivers 220 and 222. The channels 208 and 214 may include, for example, transmission media such as fiber optic cables, twisted pair wires, coaxial cables, and air (in the case of wireless transmission). Bidirectional communication between Node A and Node B can be provided using separate channels 208 and 214, or in some embodiments, a single channel that transports signals in opposing directions without interference.

A transmitter 206 of the transceiver 220 receives data from Node A, and transmits the data to the transceiver 222 via a signal on the channel 208. The signal may be, for example, an electrical voltage, an electrical current, an optical power level, a wavelength, a frequency, or a phase value. A receiver 210 of the transceiver 222 receives the signal via the channel 208, uses the signal to recreate the transmitted data, and provides the data to Node B. Similarly, a transmitter 212 of the transceiver 222 receives data from Node B, and transmits the data to the transceiver 220 via a signal on the channel 214. A receiver 216 of the transceiver 220 receives the signal via the channel 214, uses the signal to recreate the transmitted data, and provides the data to Node A.

The channel includes a physical medium, such as a fiber optic cable or a pair of copper wires. The physical medium is less than ideal, meaning that in many cases the different frequency components of a signal will propagate with varying speeds. As a result, the signal tends to spread or disperse as it passes through the medium.

Due to dispersion occurring in the channel, energy of a transmitted symbol often extends outside of its allocated symbol interval. Energy of a symbol arriving before a corresponding symbol interval is termed leading intersymbol interference (ISI), and energy of the symbol arriving after the corresponding symbol interval is termed trailing ISI. As described below, the conventional DFE 300 includes circuitry for reducing the effects of both leading and trailing ISI.

Figure 3:
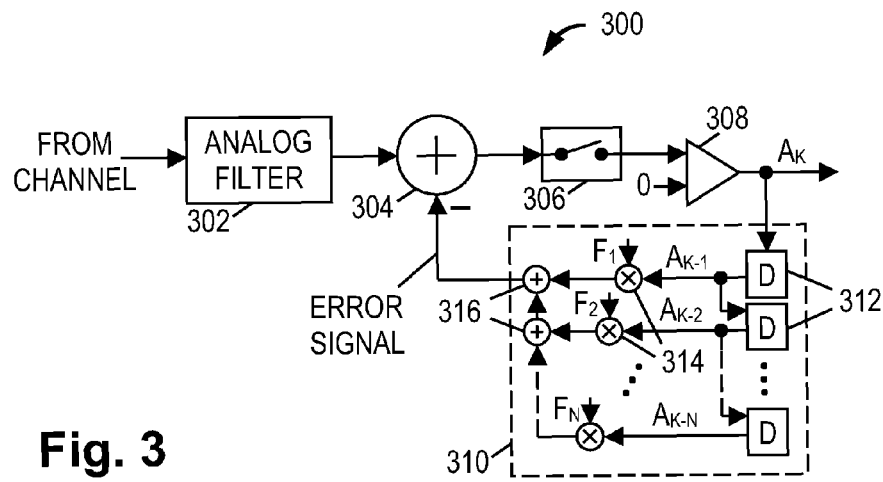
FIG. 3 shows a conventional decision feedback equalizer (DFE)

FIG. 3 is a diagram of a conventional decision feedback equalizer (DFE) 300. In the embodiment of FIG. 3, an analog input signal, received from a channel, is an electrical voltage signal that conveys binary digital data. A binary logic '0' is represented by a first symbol: an electrical voltage level within a first predefined voltage range. A binary logic '1' is represented by a second symbol: an electrical voltage level within a second predefined voltage range. When a logic '0' is transmitted, the electrical voltage signal has a level within the first voltage range, and when a logic '1' is transmitted, the electrical voltage signal has a level within the second voltage range. Individual bits of the binary data are transmitted in consecutive adjoining symbol intervals.

In the conventional DFE 300 of FIG. 3, an analog filter 302 receives the analog input signal, and operates on it to minimize the effects of leading ISI. The analog filter 302 provides the filtered input signal to a non-inverting input of an analog summer 304, which combines it with an error signal provided to the inverting input of the summer 304. The summer 304 adds the filtered input signal and an inverted version of the error signal to produce a combined input signal.

A sample-and-hold 306 receives the combined input signal produced by the summer 304, and samples the combined input signal in response to a clock signal (e.g., a recovered timing signal). The resulting sampled input signal is provided as an input to an analog comparator 308. An analog voltage level representing a decision threshold between the symbol values (e.g., zero volts if the input symbols are bipolar (−1, +1)) is provided as the baseline input to the analog comparator 308. The comparator 308 compares a voltage level of the sampled input signal to the decision threshold value, producing a digital output signal '$A_K$' of the DFE 300. The output signal '$A_K$' is a '−1' when the voltage level of the sampled input signal is less than the threshold value, and is a '+1' when the voltage level of the sampled input signal exceeds the threshold value.

The output signal '$A_K$' is provided to a feedback filter 310 that generates the error signal. The feedback filter 310 includes a sequence of N delay units 312, each storing and outputting a delayed version of the output signal '$A_K$'. Each of the N delay units 312 provides a delay of one symbol interval. The delay units 312 may be, for example, latches, flip-flops, or registers receiving a common control signal (e.g., a common clock signal). The delay units 312 are connected in series a shown in FIG. 3 such that the output of one is connected to the input of another, effectively forming an N-bit shift register.

Within the feedback filter 310, the output of each of the delay units 312 is also provided to an input of one of multiple analog multipliers 316. A different filter coefficient '$F_X$' is provided to each of the multipliers 316, where X=1, 2, ..., N. Each filter coefficient '$F_X$' is an analog voltage value. Each of the multipliers 316 produces an output voltage that is a product of the input previous output voltage level and the input filter coefficient. Each of the multipliers 316 may be or include, for example, an adjustable resistance network having a resistance value dependent upon the input filter coefficient, or an amplifier having a voltage gain dependent upon the input filter coefficient.

Within the feedback filter 310, the outputs of the multipliers 316 are summed via a network of summation nodes 316 to provide the error signal. The error signal has a voltage value given by: $A_{K-1}F_1 + A_{K-2}F_2 + \ldots + A_{K-N}F_N + c$. (The DC offset value 'c' allows the output symbol set to be chosen at will, e.g., binary values (0,1), bipolar values (−1,+1), or some other representation. The various filter coefficients are determined based on the channel, and can be found adaptively and/or by characterizing the channel before communication starts in accordance with known methods.

The filtering action of the analog filter 302 enhances a signal-to-noise ratio of the analog input signal, and also reduces the effect of leading ISI on symbols conveyed by the analog input signal. When the filter coefficients are properly adjusted to match characteristics of the channel, the subtracting of the error signal from the filtered input signal reduces the effect of trailing ISI in the received signal. With the effects of both leading and trailing ISI reduced, the accuracy with which the transmitted data can be recovered from the analog input signal is increased.

A problem arises in the conventional DFE 300 of FIG. 3 in that the feedback filter 310 must generate the error signal, and the summer 304 must add the error signal to the filtered input signal produced by the analog filter 302, in less than one symbol interval. At 10 Gbit/s ($10 \times 10^9$ bits/sec), the symbol interval is only 100 picoseconds, an insufficient interval for the determination and removal of trailing ISI. To address this difficulty, some of the disclosed embodiments employ pre-computation and parallelization.

Figure 4:
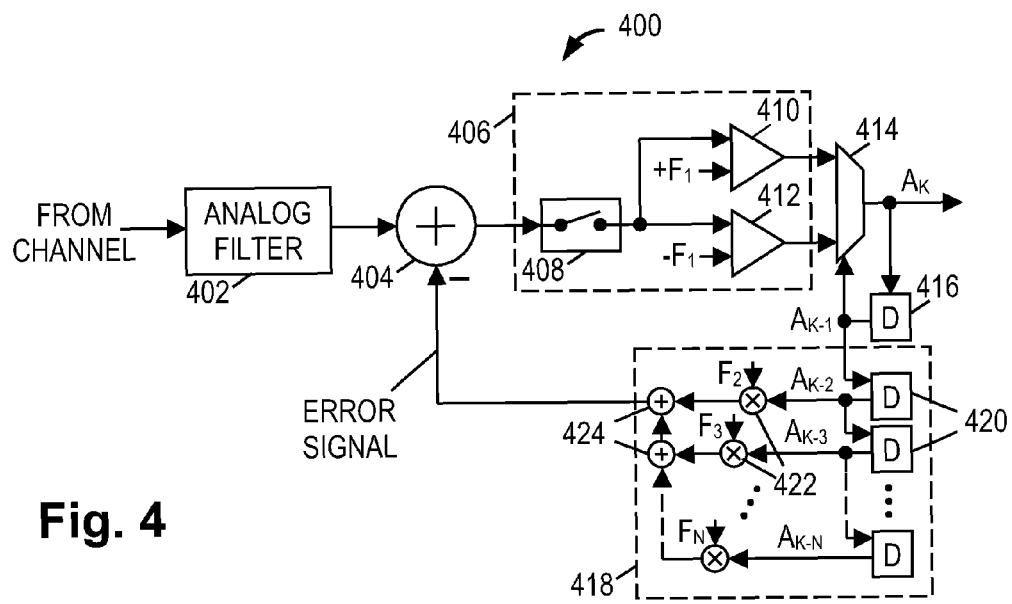
FIG. 4 shows one embodiment of a DFE employing one-tap pre-computation.

FIG. 4 is a diagram of one embodiment of a decision feedback equalizer (DFE) 400 that employs one-tap pre-computation. In the DFE 400 of FIG. 4, an analog filter 402 receives the analog input signal, and as before, it provides a filtered input signal to a non-inverting input of an analog summer 404. An error signal, the generation of which is described below, is provided to an inverting input of the summer 404. The summer 404 adds the filtered input signal and an inverted version of the error signal to produce an output combined input signal. The analog summer 404 thus subtracts the error signal from the filtered input signal to produce the combined input signal.

A sample-and-hold 408 of a pre-computation unit 406 receives the combined input signal produced by the summer 404, and samples the combined input signal in response to a clock signal. The resulting sampled input signal is provided to a pair of analog comparators 410 and 412. A first threshold voltage '+F1' is provided as a baseline signal to comparator 410, and a second threshold voltage '−F1' is provided as a baseline signal to comparator 412. The two threshold voltages +F1 and −F1 represent the product of the first filter coefficient F1 described above, with the two possible values of $A_{K-1}$, '+1' and '−1'. Thus comparator 410 compares a voltage level of the sampled input signal to the first threshold voltage +F1, producing an output that indicates the input signal is within the first voltage range (representing a '−1') when the voltage level of the sampled input signal is less than the first threshold voltage +F1, and within the second voltage range (representing a '+1') when the voltage level of the sampled input signal exceeds the first threshold voltage +F1. Similarly, the comparator 412 compares the voltage level of the sampled input signal to the first threshold voltage −F1, producing an output that indicates the input signal is within the first voltage range (representing a '−1') when the voltage level of the sampled input signal is less than the first threshold voltage −F1, and within the second voltage range (representing a '+1') when the voltage level of the sampled input signal exceeds the first threshold voltage −F1.

The outputs of the comparators 410 and 412 represent two speculative decisions as to the value of a transmitted data bit. The outputs of the comparators 410 and 412 are provided to a multiplexer (MUX) 414, which produces an output signal '$A_K$' based on an input indicating the value of '$A_{K-1}$'. In this manner, DFE 400 shifts the compensation for the trailing ISI effect of '$A_{K-1}$' from analog summer 404 to multiplexer 414.

DFE 400 produces the stream of '$A_K$' decisions as its output. A delay unit 416 receives the output signal $A_K$, and produces the signal as an output signal '$A_{K-1}$' one symbol interval later. Thus the signal $A_{K-1}$ produced by the delay unit 416 is a previous output value of the DFE.

The previous output signal $A_{K-1}$ is also provided to a shortened feedback filter 418 that generates the error signal. Unlike feedback filter 310, the shortened feedback filter 418 does not compensate for the trailing ISI effect of '$A_{K-1}$', because that ISI is being handled by the pre-computation unit. The error signal has a voltage value given by: $A_{K-2}F_2 + A_{K-3}F_3 + \ldots + A_{K-N}F_N + c$.

As previously mentioned with reference to the conventional DFE 300 of FIG. 3, the feedback filter 310 must generate the error signal, and the summer 304 must add the error signal to the filtered input signal produced by the analog filter 302, in less than one symbol interval. In the DFE 400 of FIG. 4, however, the pre-computation unit 406 allows up to two symbol intervals for the feedback filter 418 to generate and add the error signal to the filtered input signal. The pre-computation unit 406 effectively pre-computes the $A_{K-1}F_1$ term for the feedback filter. As each pre-computed feedback term extends the feedback computation time by one symbol period, pre-computing N terms of a DFE error signal allows up to (N+1) symbol periods for a feedback filter to generate the error signal to be added to the filtered input signal.

Figure 5:
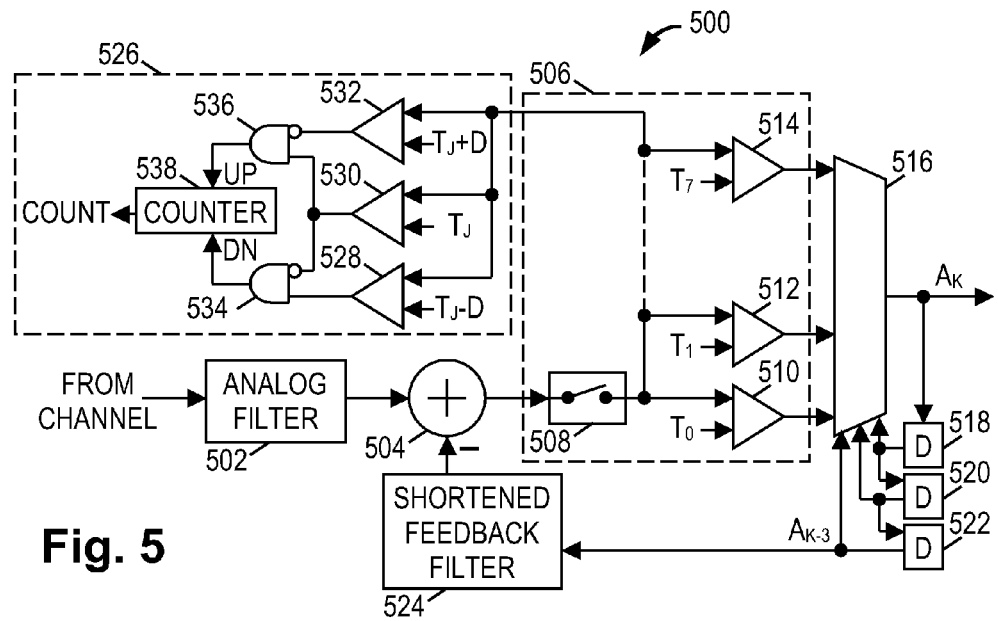
FIG. 5 shows one embodiment of a DFE employing three-tap pre-computation.

FIG. 5 shows a decision feedback equalizer (DFE) 500 having a pre-computation unit 506 that pre-computes the first 3 terms of an error signal for the DFE feedback filter, and also includes an optional threshold adapter unit 526 that modifies threshold voltages during operation. As before, an analog filter 502 receives the analog input signal and provides a filtered input signal to a non-inverting input of an analog summer 504. The summer 504 combines the filtered input signal with an inverted error signal from s shortened feedback filter 524. A sample-and-hold 508 of the pre-computation unit 506 samples the combined input signal produced by the summer 504. The resulting sampled input signal is provided to each of 8 analog comparators including analog comparators 510, 512, and 514. A first threshold voltage '$T_0$' is provided to as a baseline to analog comparator 510, a second threshold voltage '$T_1$' is provided as a baseline to analog comparator 512, and an eighth threshold voltage '$T_7$' is provided as a baseline for the analog comparator 514.

The eight threshold voltages correspond to the eight possible combinations of output symbol values $A_{K-3}A_{K-2}A_{K-1}$, e.g., (−1, −1, −1), (−1, −1, +1), (−1, +1, −1), . . . . Thus, for example, threshold voltage '$T_0$' is given by: (−F3)+(−F2)+(−F1), the threshold voltage '$T_1$' is given by: (−F3)+(−F2)+(+F1), and the threshold voltage '$T_7$' is given by: (+F3)+(+F2)+(+F1). Each of the comparators renders a speculative −1 or +1 decision by comparing its input to the corresponding threshold voltage. The outputs of the 8 comparators are provided to a multiplexer (MUX) 516. The MUX 516 produces an output signal '$A_K$' based on the selection signals from delay elements holding output symbol values $A_{K-3}A_{K-2}A_{K-1}$. The output signal '$A_K$' is provided as an output stream from the DFE 500, and is further passed through a sequence of delay units 518, 520, 522 before being employed by the shortened feedback filter 524 to generate the error signal. In this embodiment, the error signal has a voltage value given by: $A_{K-4}F_4 + A_{K-5}F_5 + \ldots + A_{K-N}F_N + c$.

Because the first three terms (i.e., the $A_{K-1}F_1$, $A_{K-2}F_2$, and $A_{K-3}F_3$ terms) are dropped from the error signal calculation by the feedback filter, the pre-computation unit 506 is also referred to as a "3-tap pre-computation unit." This pre-computation of the first three terms of the DFE error signal allows 4 symbol periods for the feedback filter 524 to generate the error signal, and the summer 504 to add the error signal to the filtered input signal.

The optional threshold adapter unit 526 modifies the eight threshold voltages $T_0, T_1, \ldots, T_7$ during operation. In the embodiment of FIG. 5, the optional threshold adapter unit 526 includes three comparators 528, 530, and 532, two logic gates 534 and 536, and an up/down counter 538. The comparator 528 receives the sampled input signal produced by the sample-and-hold 508, and a voltage value ($T_J$−D) at the threshold input, where $T_J$ is one of the eight threshold voltages $T_0, T_1, \ldots, T_7$ (J=0, 1, 2, . . . , 7), and D is a voltage value selected to create two voltage ranges or windows about the threshold value $T_J$ as described below. The comparator 528 compares a voltage level of the sampled input signal to the voltage value ($T_J$−D), producing a logic '0' output when the voltage level of the sampled input signal is less than the voltage value ($T_J$−D), and a logic '1' output when the voltage level of the sampled input signal exceeds the voltage value ($T_J$−D).

The comparator 530 receives the sampled input signal produced by the sample-and-hold 508 and compares it to the threshold value $T_J$, producing a logic '0' output when the voltage level of the sampled input signal is less than the threshold value $T_J$, and a logic '1' output when the voltage level of the sampled input signal exceeds the voltage value $T_J$. Similarly comparator 532 produces a logic '0' when the sampled signal is below ($T_J$−D), and a logic '1' when it is above.

The logic gate 534 receives the output of the comparator 528 at one input, and the output of the comparator 530 at a second input. The logic gate 534 logically inverts the input from the comparator 530, and logically ANDs the result with the input from the comparator 528 to produce an output indicating when the sampled voltage is between ($T_J$–D) and $T_J$. Similarly, the output of logic gate 536 indicates when the sampled input signal is between $T_J$ and ($T_J$+D). The output of the logic gates 534 and 536 are provided to an up/down counter 538. When the output of gate 536 is high, the counter counts up, and when the output of gate 534 is high, the counter counts down. In effect the counter determines the difference between the number of times the sampled signal is in a window above threshold $T_J$ and the number of times the sampled signal is in a window below the threshold $T_J$. The optional threshold adapter unit iterates through the thresholds $T_0$, $T_1$, . . . , determining the above-described difference that occurs in a given time interval, e.g., $10^{-4}$ s, and adjusting the threshold accordingly.

In the embodiment of FIG. 5, the count maintained by the up-down counter 538 is a count of a number of times the sampled input signal is within the range between the voltage values $T_J$ and ($T_J$+D) (i.e., is within the window above the threshold value $T_J$) versus a number of times the sampled input signal is within the range between the voltage values $T_J$ and ($T_J$–D) (i.e., is within the window below the threshold value $T_J$). The adapter unit 526 adjusts the threshold value $T_J$ to reduce the count.

For example, one of the threshold voltages $T_J$ may be provided to the inputs of the comparators 528, 530, and 532, and the count of the up/down counter 538 may be initialized to a predetermined value. After a predetermined period of time, the count may be obtained from the up/down counter 538. If the count is above an upper count threshold value, indicating that the sampled input signal is more often in the range or window between $T_J$ and ($T_J$+D), the threshold voltage $T_J$ is adjusted downward. If, on the other hand, the count is below a lower count threshold value, indicating that the sampled input signal is often in the range or window between $T_J$ and ($T_J$–D), the threshold voltage $T_J$ is adjusted upward. This process is preferably repeated for all of the threshold voltages $T_J$ (J=0, 1, . . . , 7). In some embodiments, the threshold adapter unit 526 continuously cycles through each of the threshold voltages $T_1$, $T_2$, . . . , and $T_7$. In other embodiments, the threshold adapter unit 526 adjusts all of the threshold voltages $T_1$, $T_2$, . . . , and $T_7$ at the same time.

Figure 6:
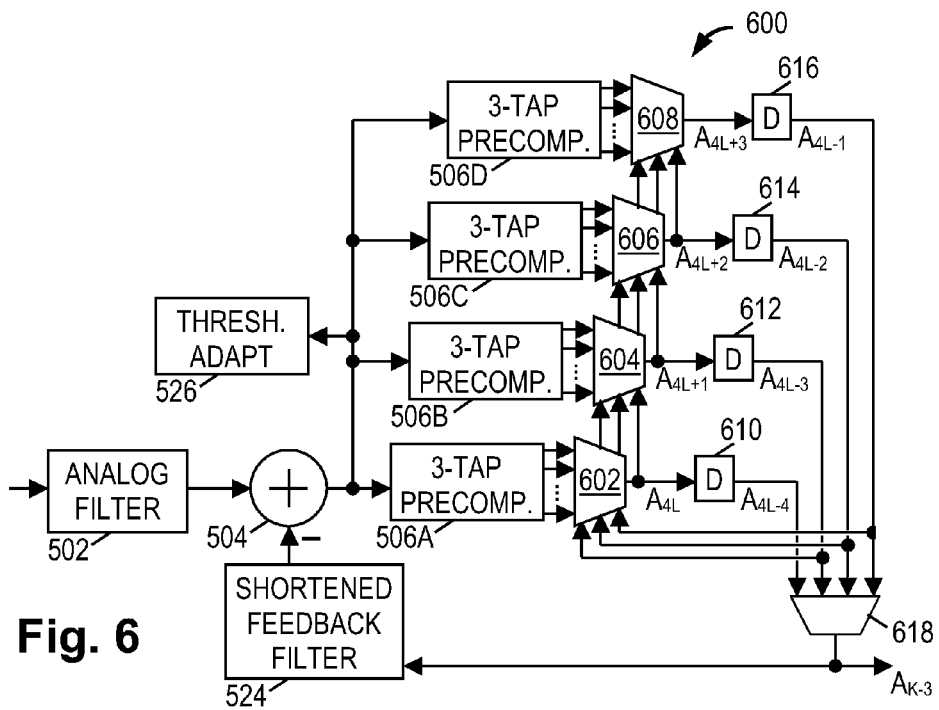
FIG. 6 shows one embodiment of a DFE employing parallel pre-computation units.

FIG. 6 shows a DFE embodiment 600 in which pre-computation units 506 are parallelized to provide multiple copies labeled 506A-506D in FIG. 6. The pre-computation units 506A-D alternately sample the combined input signal, produced by the summer 504, such that the timing constraints on the sample-and-holds 508 of the pre-computation units 506A-D are reduced. In other words, the pre-computation units 506A-D take turns sampling the combined input signal in an interleaved manner. Pre-computation unit 506A samples the combined input signal during a symbol interval, unit 506B samples the signal in the next symbol interval, unit 506C samples the signal in the following symbol interval, then unit 506D samples the signal, and the cycle repeats in a rotating fashion.

In the embodiment of FIG. 6, each of the pre-computation units 506A-D samples the combined input signal, produced by the summer 504, every fourth symbol interval. This circumstance provides a greater amount of time for the components of the pre-computation unit to operate, including the sample-and-holds units and the comparators.

The DFE 600 also includes the analog filter 502, the summer 504, the shortened feedback filter 524, and the optional threshold adapter unit 526 described above. As described in more detail below, a multiplexer (MUX) 602 receives the speculative decision inputs from the pre-computation unit 506A, from which it selects an output signal '$A_{4L}$'. (L is a cycle number that is related to the symbol interval index K by the formula K=4L+M, where M is the pre-computation unit index.) A multiplexer (MUX) 604 receives speculative decision inputs from the pre-computation units 506B, from which it selects an output signal '$A_{4L+1}$'. A multiplexer (MUX) 606 receives speculative decision inputs from the pre-computation unit 506C, from which it selects an output signal '$A_{4L+2}$'. A multiplexer (MUX) 608 receives speculative decision inputs from the pre-computation unit 506D, from which it selects an output signal '$A_{4L+3}$'.

Each multiplexer is coupled to a corresponding delay unit 610-616 that receives delays the multiplexer output by four symbol intervals, e.g., delay unit 610 delays signal $A_{4L}$ to produce output signal '$A_{4L-4}$' four symbol intervals later, unit 612 delays signal $A_{4L+1}$ to produce output signal '$A_{4L-3}$', unit 614 delays signal $A_{4L+2}$ to produce output signal '$A_{4L-2}$', and unit 616 delays signal $A_{4L+3}$ to produce output signal '$A_{4L-1}$'.

During a first symbol interval, the MUX 602 receives the speculative outputs of the 8 comparators of the pre-computation unit 506A (see FIG. 5) at its data inputs, receives the signals $A_{4L-3}$, $A_{4L-2}$, and $A_{4L-1}$ at its control inputs, and selects the appropriate comparator signal as output signal $A_{4L}$.

During a second symbol interval following the first symbol interval, the MUX 604 receives the speculative outputs of the 8 comparators of the pre-computation unit 506B at its data inputs, receives the signals $A_{4L-2}$, $A_{4L-1}$, and $A_{4L}$ at its control inputs, and selects the appropriate comparator signal as output signal $A_{4L+1}$.

During a third symbol interval following the second symbol interval, the MUX 606 receives the speculative outputs of the 8 comparators of the pre-computation unit 506C at its data inputs, receives the signals $A_{4L-1}$, $A_{4L}$, and $A_{4L+1}$ at its control inputs, and selects the appropriate comparator signal as output signal $A_{4L+2}$.

During a fourth symbol interval following the third symbol interval, the MUX 608 receives the speculative outputs of the 8 comparators of the pre-computation unit 506D at its data inputs, receives the signals $A_{4L}$, $A_{4L+1}$, and $A_{4L+2}$ at its control inputs, and selects the appropriate comparator signal as output signal $A_{4L+3}$.

A multiplexer (MUX) 618 serializes the interleaved output signals $A_{4L-4}$, $A_{4L-3}$, $A_{4L-2}$, and $A_{4L-1}$ to produce an output signal $A_{K-3}$ of the DFE 600. The MUX 618 receives the signals $A_{4L-4}$, $A_{4L-3}$, $A_{4L-2}$, and $A_{4L-1}$ at data inputs, and cycles through them to produce the output signal $A_{K-3}$. As described above, with the pre-computation units 506A-D having accounted for the first three terms (i.e., the $A_{K-1}F_1$, $A_{K-2}F_2$, and $A_{K-3}F_3$ terms) of a DFE error signal, the shortened feedback filter 524 uses the signal $A_{K-3}$ to produce the error signal having a voltage value given by: $A_{K-4}F_4 + A_{K-5}F_5 + \ldots + A_{K-N}F_N$.

In the embodiment of FIG. 6, the optional threshold adapter unit 526 receives the sampled input signal produced by the sample-and-holds 508 of the pre-computation units 506A-506D, and periodically modifies the threshold voltages $T_0$, $T_1$, . . . , $T_7$ provided to the inputs of the 8 comparators of the pre-computation units 506A-506D. As described above, the optional threshold adapter unit 526 uses the count produced by the up/down counter 538 (see FIG. 5) to estimate a relative frequency of sampled input signal occurrences within a range or window above, and within a range or window below, each of the threshold voltages. The threshold adapter unit 526 uses this frequency information to adjust or update the threshold voltages in parallel for each of the pre-computation units 506A-D. In other embodiments, each of the pre-computation units 506A-506D has its own threshold adapter unit.

FIG. 7 is a flowchart of one embodiment of a method 700 for high speed equalization. The method 700 may be, for example, carried out by the DFE 600 of FIG. 6. During a first step 702, an incoming signal is filtered. For example, the signal may be an analog signal used to convey binary data, where individual bits of the binary data are transmitted in consecutive adjoining symbol intervals. The incoming analog signal may be passed through an analog filter in order to enhance a signal-to-noise ratio of the incoming analog signal and/or to reduce leading intersymbol interference (ISI).

The incoming signal is partially compensated for trailing ISI during a step 704. For example, as described above, previous decisions as to the logic values of binary data conveyed by a signal are used to generate an error signal, and the error signal is subtracted from an incoming signal in order to reduce trailing ISI.

During a step 706, sampling of the incoming signal is interleaved among multiple pre-computation units. For example, in the DFE 600 of FIG. 6, the multiple pre-computation units 506A-D take turns sampling the incoming signal as described above.

The multiple pre-computation units compare samples of the incoming signal with multiple threshold values, and with multiple adaptation windows, during a step 708. For example, in the DFE 600 of FIG. 6, the 8 comparators of the pre-computation units 506A-D compare samples of the incoming signal with the threshold values $T_0$, $T_1$, . . . , and $T_7$. The optional threshold adapter unit 526 compares the samples of the incoming signal to the threshold values, either sequentially or concurrently, to determine a relative frequency of the samples being within a window above, and within a window below, each of the threshold voltages. The threshold adapter unit 526 uses this frequency information to adjust or update the threshold voltages.

During a step 710, outputs of the multiple pre-computation units are used to select one of multiple speculative decisions as an output decision. For example, in the DFE 600 of FIG. 6, the multiplexer 602 selects an appropriate one of multiple speculative decisions produced by the 8 comparators of the pre-computation unit 506A dependent upon previous decisions $A_{4L-3}$, $A_{4L-2}$, and $A_{4L-1}$, and the MUX 618 produces one of the signals $A_{4L-4}$, $A_{4L-3}$, $A_{4L-2}$, and $A_{4L-1}$ as the output signal $A_{K-3}$ of the DFE 600.

The output decision is produced during a step 712. For example, in the DFE 600 of FIG. 6, a different digital output signal $A_{K-3}$ is produced every symbol interval.

During a step 714, the previous output decisions are used to determine the error signal that provides partial compensation for trailing ISI. For example, in the DFE 600 of FIG. 6, the shortened feedback filter 524 filters the previous output decisions to generate the error signal used to partially compensate the input signal for trailing ISI.

FIG. 8 is a diagram of one embodiment of a fiber optic interface module 800 including the DFE 600 of FIG. 6. The fiber optic interface module 800 also includes a splitter 806, a sensor 804, an amplifier 808, an emitter 810, a driver 812, and a device interface 814.

The splitter 806 is coupled to an optical fiber 802 to create two optical paths: one for receiving and one for transmitting. A sensor 804 is coupled to the splitter to receive optical signals and convert them into analog electrical signals, which are amplified by amplifier 808 and provided to DFE 600. DFE 600 converts the analog electrical signal into a digital data stream as described above. A device interface 814 receives the digital data stream and buffers it for delivery on an internal device bus in accordance with a standard bus protocol.

Device interface 814 also receives data from the internal device bus for transmission. Interface 814 supplies a transmit data stream to driver 812. Driver 812 converts the data stream into a analog electrical drive signal for emitter 810, causing the emitter to generate optical pulses that are coupled via splitter 806 to optical fiber 802.

Numerous variations and modifications will become apparent to those skilled in the art once the above disclosure is fully appreciated. It is intended that the following claims be interpreted to embrace all such variations and modifications.

What is claimed is:

1. A high speed equalization method that comprises, at each of multiple consecutive time intervals:
   sampling a signal that is partially compensated for trailing intersymbol interference dependent upon an error signal produced by a feedback filter operating on preceding decisions, wherein said sampling produces a sampled signal;
   comparing the sampled signal to a plurality of threshold values to determine a set of speculative decisions;
   selecting and outputting one of the speculative decisions based on a plurality of preceding decisions; and
   updating a counter if the sampled signal falls within a range of values about a given one of the threshold values.

2. The method of claim 1, further comprising:
   accumulating a counter value over a fixed interval; and
   adjusting the given one of the threshold values based on the counter value.

3. The method of claim 2, further comprising:
   performing said updating, accumulating, adjusting, and determining for each of said threshold values.

4. The method of claim 2, wherein said updating, accumulating, and adjusting are performed concurrently for each of said threshold values.

5. The method of claim 2, wherein said sampling and comparing and selecting are performed by a plurality of pre-computation units operating in parallel.

6. The method of claim 5, wherein each pre-computation unit performs said updating, accumulating, and adjusting operations independent of the other pre-computation units.

7. The method of claim 1, wherein the counter is incremented when the sampled signal falls in a range of values above the given threshold, and wherein the counter is decremented when the sampled signal falls in a range of values below the given threshold, and wherein the given threshold value is adjusted upward if the accumulated counter value exceeds a count threshold value.

8. A high speed equalizer that comprises:
   an analog filter that enhances a signal-to-noise ratio of a receive signal to provide a filtered receive signal;
   a summer that combines the filtered receive signal with a feedback signal to provide a combined signal;
   at least one pre-computation unit that samples the combined signal and compares the combined signal to multiple threshold values to generate a set of speculative decisions;
   a multiplexer that, based on previous decisions, selects from the set of speculative decisions to provide a selected decision for output from the equalizer;
   a feedback filter that operates on the selected decision to provide said feedback signal; and
   at least one adaptation unit that estimates a number of times a sampled signal is in a first range of values above a given one of the threshold values versus a number of times the sampled signal is in a second range of values below the given one of the threshold values.

9. The equalizer of claim 8, wherein the at least one adaptation unit uses the estimate of the number of times the sampled signal is in the first range of values versus the number of times the sampled signal is in the second range of values to adjust the given one of the threshold values.

10. The equalizer of claim 8, wherein said at least one pre-computation unit comprises a plurality of pre-computation units that take turns sampling the combined signal.

11. The equalizer of claim 10, wherein each of said pre-computation units has a corresponding adaptation unit that adjusts each of the multiple threshold values.

12. The equalizer of claim 8, wherein the equalizer outputs the selected decision at a rate in excess of 10 GHz.

13. A fiber optic interface module that comprises a receiver having:
- a sensor that converts incident optical signals into analog electrical signals;
- an analog filter that enhances the signal-to-noise ratio of the analog electrical signals;
- a summer that combines a feedback signal with an output signal from the analog filter;
- a plurality of pre-computation units that take turns sampling a combined signal produced by the summer, wherein each pre-computation unit compares a sample of the combined signal with a set of threshold values to generate a set of speculative decisions, wherein each pre-computation unit further selects one of the speculative decisions for output based on previous decisions from other ones of the pre-computation units;
- a device interface that provides the outputs of the pre-computation units as a received data stream; and
- at least one adaptation unit that periodically adjusts the threshold values.

14. The module of claim 13, further comprising a transmitter that receives a transmit data stream from said device interface and converts said transmit data stream to an optical transmit signal.

15. The module of claim 14, wherein the received data stream carries at least 10 Gbit/s.

16. The module of claim 13, further comprising a feedback filter that generates said feedback signal based on previous decisions.

17. The module of claim 13, wherein the at least one adaptation unit counts a number of times a sampled signal is within a first range of values above a given threshold value versus a number of times the sampled signal is within a second range of values below the given threshold value, and adjusts the given threshold value to reduce the count.

18. The module of claim 17, wherein the at least one adaptation unit adjusts each of the threshold values.

19. The module of claim 17, wherein each pre-computation unit has a corresponding adaptation unit.

20. The module of claim 17, further comprising an adaptation unit for each threshold value.

* * * * *